(12) United States Patent
Pristinski

(10) Patent No.: US 11,067,433 B2
(45) Date of Patent: *Jul. 20, 2021

(54) OPTICAL DETECTION SYSTEM WITH LIGHT SAMPLING

(71) Applicant: Bio-Rad Laboratories, Inc., Hercules, CA (US)

(72) Inventor: Denis Pristinski, Pleasanton, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/404,637

(22) Filed: May 6, 2019

(65) Prior Publication Data

US 2019/0257687 A1 Aug. 22, 2019

Related U.S. Application Data

(63) Continuation of application No. 15/394,515, filed on Dec. 29, 2016, now Pat. No. 10,281,320.

(60) Provisional application No. 62/272,436, filed on Dec. 29, 2015.

(51) Int. Cl.
  *G01J 1/42* (2006.01)
  *G02B 27/10* (2006.01)
  *G01J 1/04* (2006.01)

(52) U.S. Cl.
  CPC .......... *G01J 1/0455* (2013.01); *G01J 1/0407* (2013.01); *G01J 1/0414* (2013.01); *G01J 1/0425* (2013.01); *G01J 1/4257* (2013.01); *G02B 27/108* (2013.01)

(58) Field of Classification Search
  CPC ............................. G01J 1/4257; G02B 6/421
  See application file for complete search history.

(56) References Cited

U.S. PATENT DOCUMENTS

| | | | | |
|---|---|---|---|---|
| 3,215,843 A | * | 11/1965 | Neil | ..................... H05B 39/081 |
| | | | | 250/205 |
| 4,329,659 A | | 5/1982 | Chen | |
| 5,953,145 A | * | 9/1999 | Koyama | ............ H04B 10/1143 |
| | | | | 398/156 |
| 6,014,486 A | | 1/2000 | Robinson | |
| 6,201,628 B1 | | 3/2001 | Basiji et al. | |
| 6,312,166 B1 | | 11/2001 | Zediker et al. | |
| 6,324,330 B1 | | 11/2001 | Stites | |
| 6,476,908 B1 | | 11/2002 | Watson | |
| 2007/0086211 A1 | * | 4/2007 | Beeson | ............. G02F 1/133603 |
| | | | | 362/628 |

(Continued)

FOREIGN PATENT DOCUMENTS

| CN | 101042901 A | 9/2007 |
|---|---|---|
| CN | 102101752 A | 6/2011 |
| CN | 102136278 A | 7/2011 |

OTHER PUBLICATIONS

China National Intellectual Property Administration, "Notice on the First Office Action" in connection with related Chinese Patent App. No. 201680082542.5, dated Nov. 4, 2019, 16 pgs.

(Continued)

*Primary Examiner* — Thanh Luu
(74) *Attorney, Agent, or Firm* — Kolisch Hartwell, P.C.

(57) ABSTRACT

System, including methods and apparatus, for optical detection. The system may comprise a light source to generate a beam of light, an optical element including a light guide and an exit window, and at least one detector.

19 Claims, 6 Drawing Sheets

(56) References Cited

U.S. PATENT DOCUMENTS

| | | |
|---|---|---|
| 2009/0324164 A1 | 12/2009 | Reshotko et al. |
| 2010/0032583 A1 | 2/2010 | Kane |
| 2012/0099820 A1 | 4/2012 | Rolston et al. |
| 2014/0218719 A1 | 8/2014 | Pristinski et al. |

OTHER PUBLICATIONS

China National Intellectual Property Administration, "Notice on the Second Office Action" in connection with related Chinese Patent App. No. 201680082542.5, dated Jul. 3, 2020, 12 pgs.

Linke, Felix, Examiner, European Patent Office, "Extended European Search Report" in connection with related European Patent App. No. 16882697, dated Jul. 10, 2019, 8 pgs.

Young, Lee W., Authorized Officer, ISA/US, Commissioner for Patents, "International Search Report" in connection with related International App. No. pct/us2016/069318, dated Apr. 18, 2017, 2 pgs.

Young, Lee W., Authorized Officer, ISA/US, Commissioner for Patents, "Written Opinion of the International Searching Authority" in connection with related International App. No. pct/us2016/069318, dated Apr. 18, 2017, 6 pgs.

European Patent Office, Communication pursuant to Article 94(3) EPC in European Patent Application No. 168826972-1020 dated Jan. 19, 2021, 5 pages.

\* cited by examiner

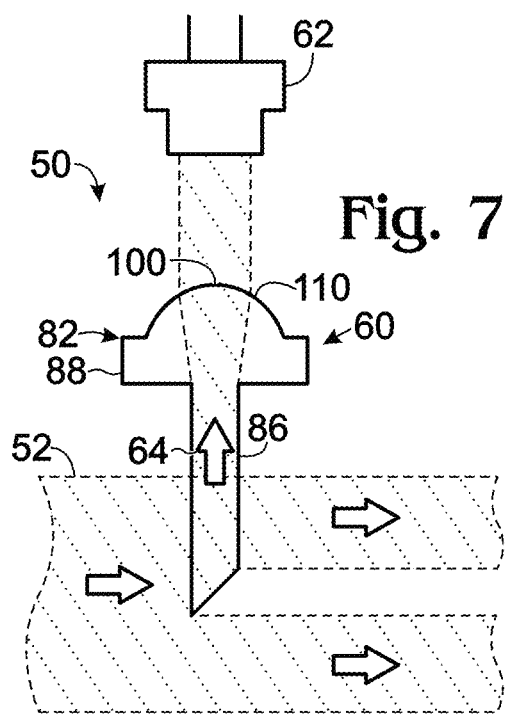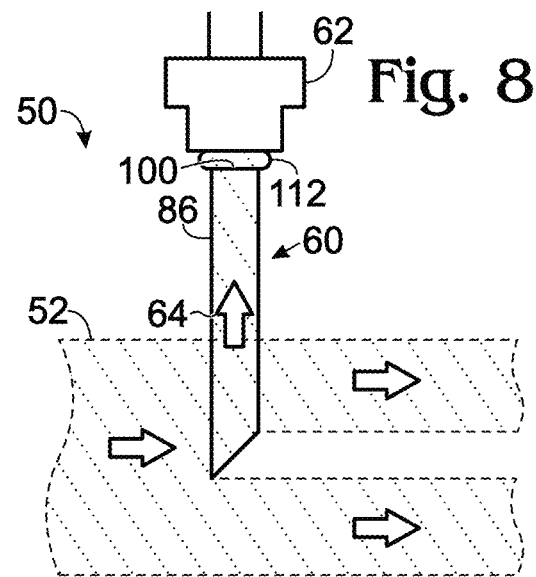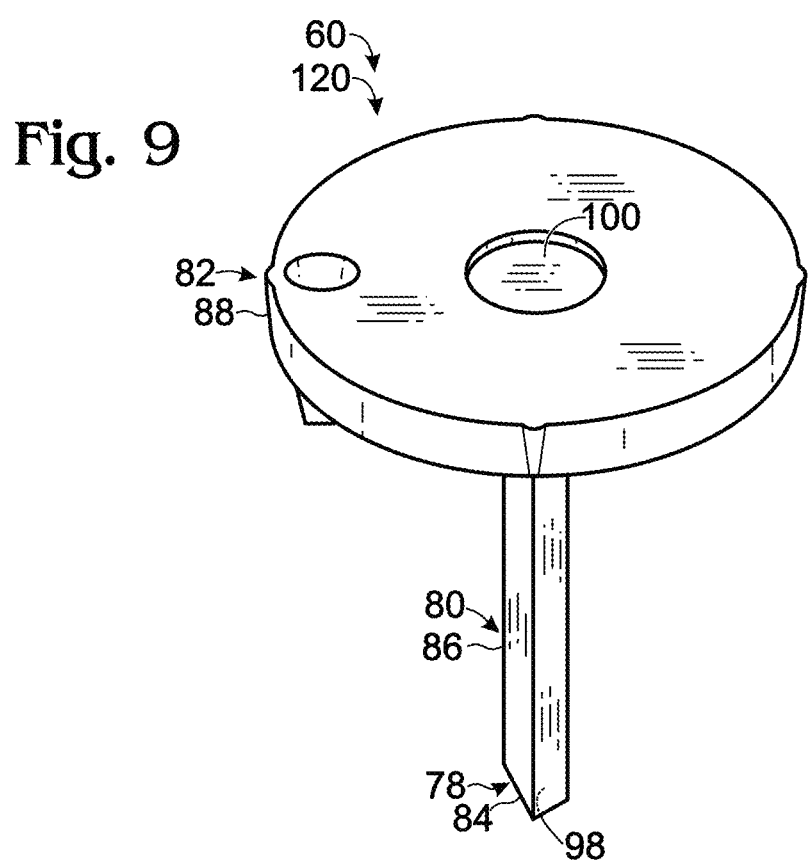

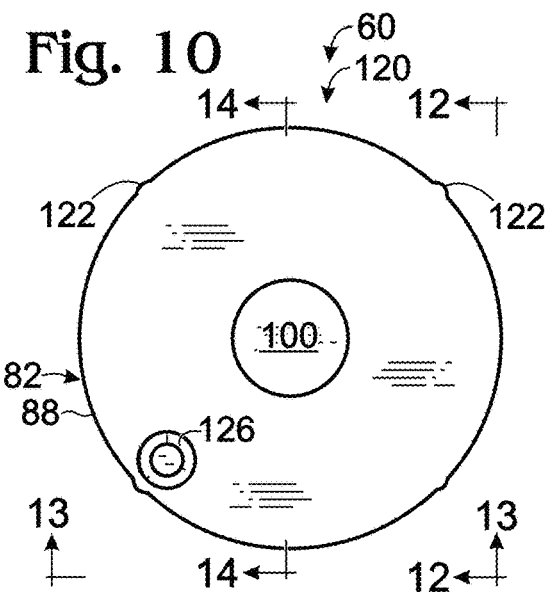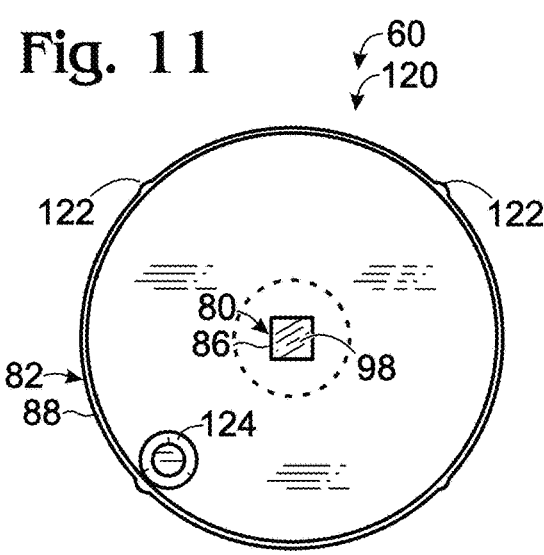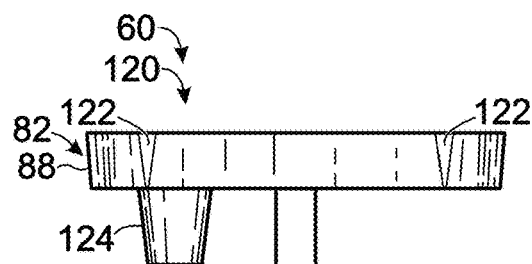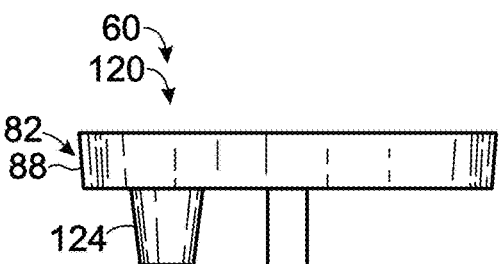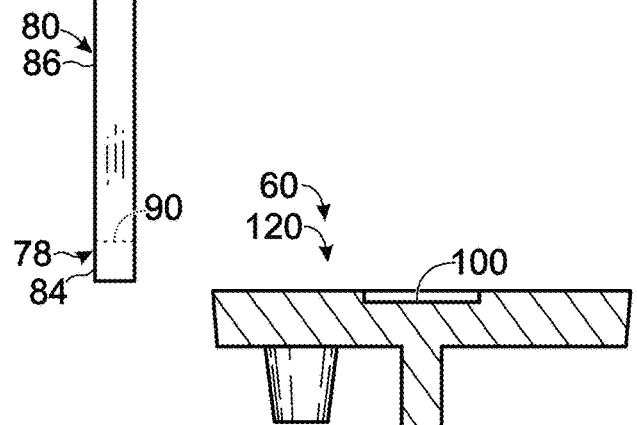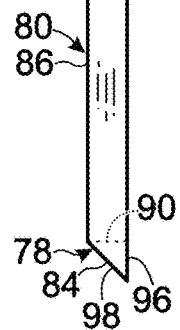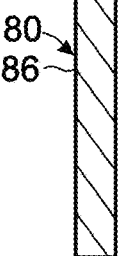

OPTICAL DETECTION SYSTEM WITH LIGHT SAMPLING

CROSS-REFERENCE TO PRIORITY APPLICATION

This application is a continuation of U.S. patent application Ser. No. 15/394,515, filed Dec. 29, 2016, now U.S. Pat. No. 10,281,320, which, in turn, is based upon and claims the benefit under 35 U.S.C. § 119(e) of U.S. Provisional Patent Application Ser. No. 62/272,436, filed Dec. 29, 2015. Each of these priority applications is incorporated herein by reference in its entirety for all purposes.

CROSS-REFERENCE TO OTHER MATERIAL

This application incorporates by reference in its entirety for all purposes the following: Joseph R. Lakowicz, PRINCIPLES OF FLUORESCENCE SPECTROSCOPY ($2^{nd}$ Ed. 1999).

INTRODUCTION

An optical detection system usually is equipped with at least one light source to produce a beam of light for irradiation of an examination site. A signal resulting from the irradiation can be detected with a detector, with the strength of the signal dependent upon the intensity of the beam. Accordingly, the beam intensity typically is monitored by the system and may be controlled by a feedback mechanism to minimize fluctuation.

A popular approach to sampling the beam's light intensity is a beam splitter positioned in the optical path between the light source and the examination site. The beam splitter reflects only a small fraction of the beam's light to a sampling detector, while allowing the rest of the light to remain on the optical path to the examination site. Alternatively, the beam splitter reflects most of the beam's light toward the examination site while transmitting a small fraction of light to the sampling detector. In either case, the beam splitter may occupy significant space in the system because the footprint of the beam splitter is typically larger than the cross-section of the beam. Also, the light reflected out of the beam is distributed across an area corresponding to the size of the beam. This relationship can increase cost and complexity by necessitating a larger sampling detector for a wider beam, or one or more additional optical elements to focus the reflected light onto a smaller sampling detector.

Another approach to sampling the beam utilizes a small mirror to reflect light out of the beam to a sampling detector. However, a support for the mirror blocks part of the beam, decreasing the efficiency of the system. Also, establishing and maintaining proper alignment of the mirror with the sampling detector can be problematic.

SUMMARY

The present disclosure provides a system, including methods and apparatus, for optical detection. The system may comprise a light source to generate a beam of light, an optical element including a light guide and an exit window, and at least one detector.

BRIEF DESCRIPTION OF THE DRAWINGS

FIG. 7 is a fragmentary view of the detection system of FIG. 1 having another exemplary light sampler, in accordance with aspects of the present disclosure.

FIG. 8 is a fragmentary view of the detection system of FIG. 1 having still another exemplary light sampler, in accordance with aspects of the present disclosure.

FIG. 9 is an isometric view of an embodiment of a light sampler for the detection system of FIG. 1.

FIG. 10 is a plan view of the light sampler of FIG. 9.

FIG. 11 is a bottom view of the light sampler of FIG. 9.

FIG. 12 is an elevation view of the light sampler of FIG. 9, taken generally along line 12-12 of FIG. 10.

FIG. 13 is another elevation view of the light sampler of FIG. 9, taken generally along line 13-13 of FIG. 10.

FIG. 14 is a sectional view of the light sampler of FIG. 9, taken generally along line 14-14 of FIG. 10.

DETAILED DESCRIPTION

Figure 1:
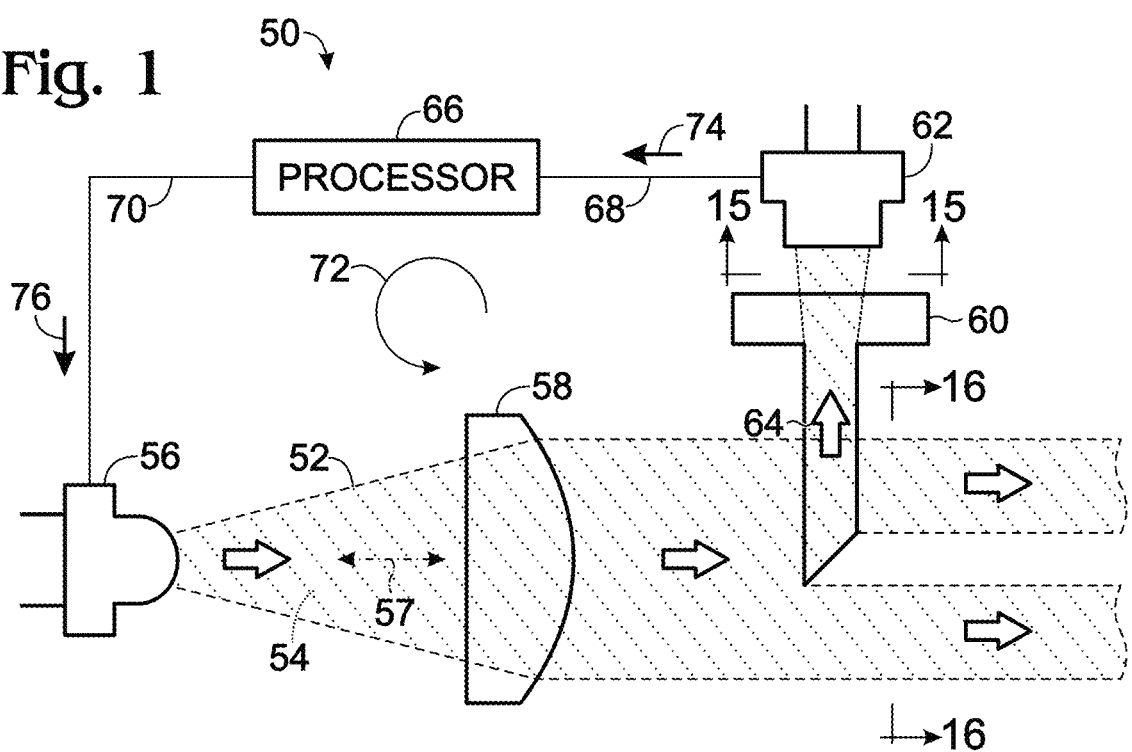
FIG. 1 is a schematic, fragmentary view of selected aspects of an exemplary optical detection system configured to monitor and control the intensity of a light beam, with the system including an exemplary optical element (a light sampler) extending into the light beam and configured to divert a fraction of the beam's light out of the beam and to a sampling detector, in accordance with aspects of the present disclosure.

The present disclosure provides a system, including methods and apparatus, for optical detection. The system may comprise a light source to generate a beam of light, an optical element, and a detector. The optical element may include a light guide having a shaft and a tip, with the tip forming a beveled end of the light guide. The optical element may extend into the beam, such that the tip and at least a portion of the shaft are located inside the beam, and a window of the optical element is located outside the beam. Light of the beam incident on the tip may be transmitted longitudinally through the light guide and out the window, while light of the beam incident on the shaft may be transmitted transversely through the shaft and remains in the beam downstream. The detector may be configured to detect light received from the window.

An exemplary optical element for sampling light is provided. The optical element may comprise a light guide configured to transmit light longitudinally through the light guide by internal reflection (e.g., total internal reflection). The light guide may include a shaft having four sides and a rectangular cross-section. The light guide also may include a tip tapering from the shaft to form a beveled end of the light guide. The tip may have a wall region that is coplanar and continuous with one of the four sides of the shaft. In some cases, the tip may include three wall regions that are each coplanar and continuous with a different side of the shaft. The optical element also may include a window located opposite the tip and formed integrally with the shaft and the tip. The tip and at least a portion of the shaft may be configured to be disposed operatively in a beam of light, with the shaft arranged orthogonal to the beam and the window located outside the beam, such that light of the beam incident on the tip enters the tip and is reflected by the beveled end of the light guide into the shaft, and is transmitted longitudinally through the shaft and out of the window, while light of the beam incident on one of the four side walls of the shaft is transmitted transversely through the shaft and remains in the beam downstream of the shaft.

An exemplary method of monitoring the intensity of a beam of light is provided. In the method, a beam of light may be generated. The beam of light may be incident on an optical element as described above and/or elsewhere herein. Light leaving the optical element outside the beam may be detected to create a signal.

Light guides that include total internal reflection elements, for coupling light in or out of the guide, are widely used in various light delivery applications. However, the present disclosure involves a light guide to sample a beam for the purpose of light intensity monitoring and/or stabilization. The disclosed light sampler has several distinct advantages over the popular solution of using a beam splitter with controlled reflectance. For example, the light sampler can have a very small footprint and may fit easily into an existing optical layout, and/or may be utilized in space-constrained applications. Also, the area of the beam that is diverted by the light sampler to a sampling detector may be comparable to a cross-sectional size of the light guide, regardless of the width of the incident beam. In contrast to a solution with a small sampling mirror, the light sampler can be operatively positioned in the beam without a support that blocks some of the incident light. Finally, for high-volume applications, the cost of the light sampler, which may be a single molded part having its own support and alignment features, may be substantially lower than alternative designs.

I. DETECTION SYSTEM OVERVIEW

This section provides an overview of an exemplary detection system 50 with light sampling; see FIGS. 1-8. The detection system interchangeably may be called an illumination system.

Detection system 50 monitors and/or stabilizes the intensity of a beam 52 of light 54. The beam is generated by at least one light source 56, follows an optical path defining an optical axis 57, and may be collimated by at least one optical element (e.g., a focusing lens 58). Another optical element, a light sampler 60, is operatively disposed in beam 52, optionally in a collimated region of the beam downstream of focusing lens 58. Light sampler 60 is configured to continuously divert a fraction of light 54 out of the beam, and to transmit the diverted light to a detector 62, indicated by an arrow at 64.

The terms "light" and "optical radiation" are used interchangeably in the present disclosure. Either term denotes ultraviolet radiation, visible light, or infrared radiation, or any combination thereof.

The open, horizontal arrows in beam 52 of FIG. 1 indicate the direction of light propagation in the beam. To facilitate description, the light can be considered to "flow" like fluid, with light traveling in the beam from positions "upstream" to positions "downstream." The arrangement of physical elements associated with the beam also can be described according to this fluid analogy. For example, in FIG. 1, light source 56 is upstream of focusing lens 58, which, in turn, is upstream of light sampler 60.

A processor 66 may be operatively connected to detector 62 and light source 56, indicated at 68 and 70, respectively, to create a feedback loop 72. Each connection may include wired and/or wireless communication. Detector 62 detects optical radiation received from light sampler 60 and creates a detected signal representative of the optical radiation detected. The detected signal is communicated to processor 66, indicated schematically by an arrow at 74. In response, processor 66 sends a control signal to light source 56 (e.g., via a light source driver), indicated schematically by an arrow at 76. The control signal is generated by the processor based on the detected signal, and controls operation of the light source. For example, the control signal may adjust the output of optical radiation from the light source, to stabilize the intensity of beam 52. The processor may be described as a controller, which may implement any suitable feedback algorithm, such as a proportional, proportional-integral, or proportional-integral-derivative algorithm, among others.

System 50 also may include one or more other detectors. Each of these other detectors may be configured to detect light resulting from interaction of the beam with a sample disposed in an examination site. The detected light may be photoluminescence (e.g., fluorescence or phosphorescence) induced by the beam. Alternatively, or in addition, the detected light may be light from the beam that has been refracted, reflected, scattered, phase-shifted, polarization-altered, diffracted, and/or transmitted, among others, by the sample.

In some embodiments, system 50 may be configured to monitor the intensity of beam 52 without any feedback control. For example, processor 66 may be in communication with detector 62 but not light source 56. Detector 62 may communicate the detected signal to the processor, which may store and/or process the signal. Processor 66 may communicate results of monitoring the signal to a user by any suitable mechanism, such as a display, a printer, or the like.

Figure 2:
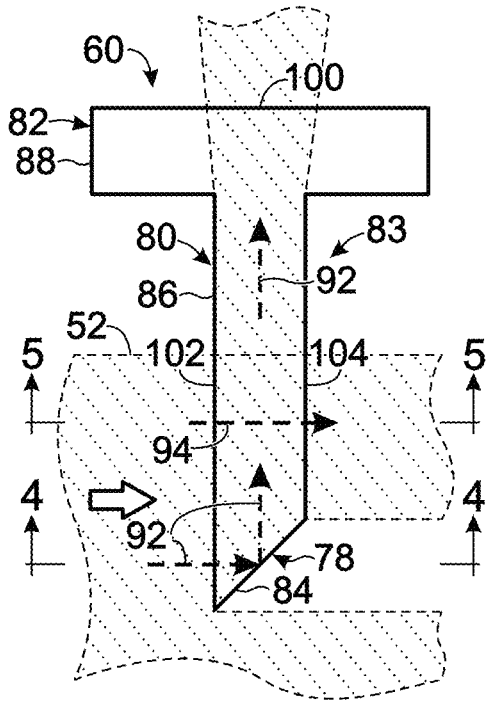
FIG. 2 is a view of the detection system of FIG. 1 taken around the light sampler and illustrating how light incident on a tip of the sampler is diverted for transmission longitudinally through a shaft of the sampler, while light incident on the shaft is transmitted transversely through the shaft without substantial deflection and remains in the beam downstream of the sampler.
Figure 3:
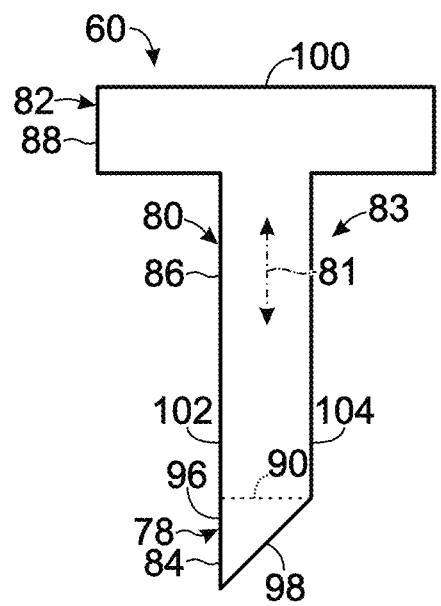
FIG. 3 is a view of the light sampler of FIG. 1, taken as in FIG. 2 but without the light beam.

FIGS. 2 and 3 show light sampler 60 respectively with and without beam 52. The light sampler includes a diverting portion 78, a guide portion 80 defining a long axis 81, and, optionally, a mounting portion 82. The diverting portion and the guide portion collectively may be described as a light guide 83 that transmits light longitudinally through the light guide by internal reflection, optionally total internal reflection (TIR). Light guide 83 and guide portion 80 may be elongated, and may be linear along at least a portion or the entire length thereof.

In the depicted embodiment, diverting portion 78 is formed by a tip 84, and guide portion 80 by a shaft 86. Tip 84 projects and tapers from an inner end of shaft 86, and may form a beveled end of the light guide. The designations "inner" and "outer" for regions of the shaft are with respect to the light beam, with the inner end of the shaft located inside the light beam and the outer end of the shaft located outside the light beam in FIG. 2. A conceptual border 90 between the shaft and the tip, which may be formed integrally with one another, is shown as a dashed line in FIG. 3.

The beveled surface of the tip may have a reflective coating on it, to encourage conventional reflection, or it can operate relying on total internal reflection. The shaft is transparent, to permit light to pass through it transversely, and therefore generally is not coated with a reflective material.

Light transmitted longitudinally through light sampler 60, light guide 83, and/or shaft 86, enters and exits the sampler, guide, and/or shaft at opposite ends thereof. The opposite ends are arranged along the long axis of the sampler, guide, and/or shaft from one another. The long axis may be linear on non-linear (e.g., curved or a combination of linear and curved, among others). The longitudinal transmission may occur at least predominantly by total internal reflection. Accordingly, rays of the light may bounce between opposite sides of the sampler, guide, and/or shaft on a zigzag path while being transmitted longitudinally through the element.

Mounting portion 82 may be formed by a base 88 disposed at the outer end of the shaft. The mounting portion may be described as a base, irrespective of the orientation of sampler 60 in the system, and thus irrespective of the relative elevations of the base and the shaft. The mounting portion may interface with a bracket or other mounting structure of the system, to fix the position of the sampler with respect to the beam, and may support light guide 83 when the sampler is mounted in the system. The mounting portion thus may include alignment features that ensure a proper orientation the light guide and walls thereof in the beam.

A function of each portion of light sampler 60 is illustrated in FIG. 2 (also see FIG. 3). Tip-incident light 92 and shaft-incident light 94 of beam 52 pass through the sampler in respective different directions, namely, longitudinally (along shaft 86) or transversely (across shaft 86), depending on whether the light strikes tip 84 or shaft 86. A majority of tip-incident light 92 and a majority of shaft-incident light 94 pass through the sampler in their respective different directions, as predicted by the Fresnel equation.

Tip-incident light 92 striking an upstream side 96 of tip 84 travels across the tip to a downstream side 98 thereof, which may be formed by a sloped surface region of the light guide (see FIGS. 2 and 3). The sloped surface region of the tip is oriented to receive light incident at greater than the critical angle, such that tip-incident light 92 is efficiently reflected into shaft 86 by total internal reflection. In exemplary embodiments, the sloped surface region of the tip is flat (i.e., planar) and may, for example, be oriented at 45 degrees with respect to the beam axis and long axis 81.

The shaft transmits light 92 along its entire length to base 88 (if present). Light 92 may be prevented from leaving the shaft at any position intermediate the inner and outer ends thereof by total internal reflection. The diverted light may be transmitted through base 88 to an exit window 100 positioned on long axis 81 opposite tip 84. Window 100 may be a surface region of the base located opposite tip 84 and facing away from light guide 83. The diverted light may travel out of sampler 60 via window 100 on a path to a sampling detector located on long axis 81 (and/or a sampling optical axis).

In exemplary embodiments, sampler 60 is oriented in beam 52 such that long axis 81 is oriented crosswise (e.g., orthogonal) to the optical path of the beam (also see FIG. 1). Any suitable portion or all of shaft 86 may be located in the beam, such as less than or greater than one-half the length of the shaft. However, a portion of shaft 86 and all of base 88 may be located outside the beam. A portion of the shaft located in the beam may be linear, and a portion the shaft located outside the beam may be linear or nonlinear.

Shaft-incident light 94 striking an upstream side 102 of shaft 86 travels transversely across the shaft to a downstream side 104. However, light 94 is not substantially reflected at side 104 and thus leaves the shaft to continue traveling downstream of shaft 86 in the beam. Accordingly, light 94 passes through the shaft substantially undeflected.

Figure 4:
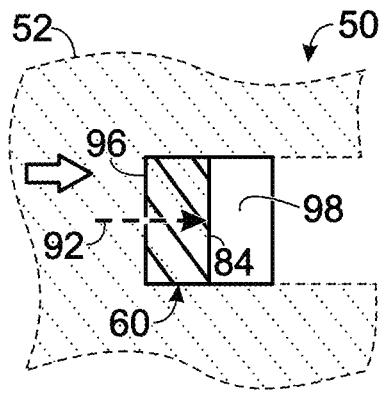
FIG. 4 is a fragmentary, sectional view of the detection system of FIG. 1, taken generally along line 4-4 of FIG. 2 through a tip of the light sampler.
Figure 5:
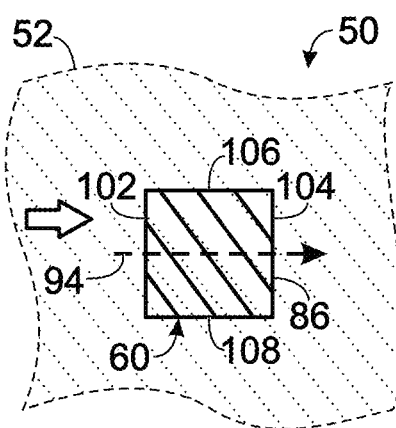
FIG. 5 is a fragmentary, sectional view of the detection system of FIG. 1, taken generally along line 5-5 of FIG. 2 through a shaft of the light sampler.

FIGS. 4 and 5 show cross-sectional views taken respectively through tip 84 and a portion of shaft 86 disposed in beam 52. In FIG. 4, tip-incident light 92 enters upstream side 96 and then is reflected into the shaft by the sloped surface region of downstream side 98. In FIG. 5, shaft-incident light 94 passes through upstream and downstream sides 102, 104.

The tip and shaft each may have a rectangular cross-section as shown. For example, the shaft may be square in cross-section. Upstream side 96 of tip 84 and upstream and downstream sides 102, 104 of shaft 86 each may be arranged orthogonal to the beam axis, which may minimize deflection of light within the beam. Opposite sides 106, 108 of shaft 86 and corresponding opposite sides of tip 84 may be arranged parallel to the optical axis of the beam. Each side of the shaft (or tip), or a surface area thereof, may be called a side wall or a wall region of the shaft (or tip). Each side or wall region of the shaft (and tip) may be flat (planar).

Figure 6:
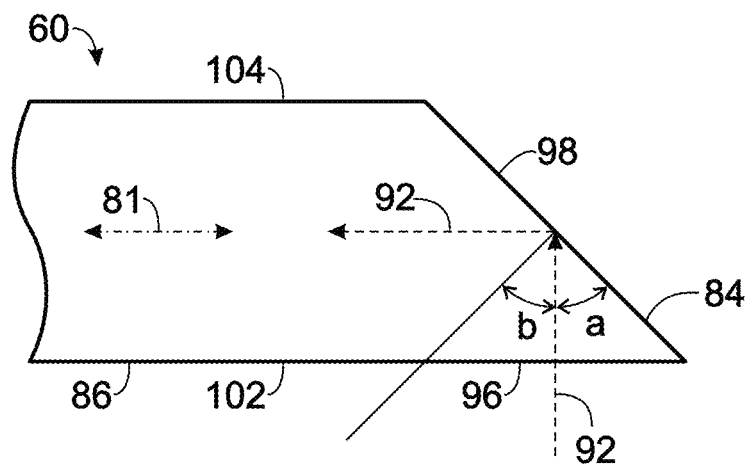
FIG. 6 is a fragmentary view of the light sampler of FIG. 1, taken around the tip and an adjacent region of the shaft.

FIG. 6 shows an end region of light sampler 60 in more detail. Sloped side 98 of tip 84 is oriented at a non-zero angle a with respect to a plane orthogonal to long axis 81. Light 92 enters tip 84 through upstream side 96, and travels across the tip 84 to sloped downstream side 98. Light 92 strikes sloped side 98 at an angle of incidence b (i.e., 90-$a$) from normal to the tip's sloped surface region. Angle b is larger than the critical angle for the interface between the tip and the surrounding medium (e.g., air), which causes light 92 to be reflected by sloped side 98 with total internal reflection. If angle a is 45 degrees, as shown in FIG. 6, light 92 is reflected into shaft 86 parallel to long axis 81 and the sides of the shaft, and is propagated through the length of the shaft with minimal reflection by the sides of the shaft. An angle a greater or less than 45 degrees, for example, 30-60 or 40-50 degrees, among others, may function effectively in some embodiments, as long as angle b is greater than the critical angle.

FIG. 7 shows detection system 50 utilizing another exemplary light sampler 60. The light sampler of FIG. 7 has a different base 88 than in FIG. 1. The base has a convex region 110 created by a protrusion located opposite the tip of the light guide and, optionally, on the long axis of shaft 86. The convex region provides window 100. Convex region 110 and/or window 100 may, for example, be spherical or aspherical. In the depicted embodiment, the convex region of base 88 collimates light as the light leaves the sampler, which permits detector 62 to be operatively positioned farther from the light sampler. In other embodiments, a convex window of the base may be configured to focus light toward and/or onto detector 62.

FIG. 8 shows detection system 50 utilizing an exemplary light sampler 60 having no base 88 (compare FIGS. 3 and 8). Window 100 is now provided by the outer end of shaft 86. Window 100 may be attached (e.g., bonded) to a front face of detector 62, to provide support for the sampler and to facilitate alignment of the light sampler with the detector. In the depicted embodiment, a bead of transparent adhesive 112 mounts light sampler 60 to the front face of detector 62.

Each light source may generate a beam of optical radiation of any suitable wavelength. The light source may include at least one light-emitting element to emit light, and, optionally, one or more optical elements to collect and/or focus the emitted light to form a beam. The beam may be divergent, collimated, and/or convergent at positions along the beam. Exemplary light sources and/or light-emitting elements include electroluminescent lamps (e.g., light-emitting diodes and lasers (such as laser diodes)), high-intensity discharge lamps (e.g., a mercury arc lamp), fluorescent lamps, incandescent lamps, and the like.

Each detector may include at least one photosensor configured to detect light of any suitable wavelength. The detector may be a point detector (e.g., a photodiode or photomultiplier) or an image sensor, among others. Exemplary image detectors detect a two dimensional array of pixels and include charge-coupled device (CCD) sensors, active pixel sensors (e.g., complementary metal-oxide-semiconductor (CMOS) sensors, N-type metal-oxide-semiconductor (NMOS) sensors, etc.), multi-pixel photon counters (e.g., silicon photomultipliers), or the like.

The light sampler may have any suitable construction. The sampler may be formed of polymer, glass, or any other optically suitable material. The material selected may have any suitable critical angle at an interface with air. The critical angle is the angle of incidence, measured from normal the interface, above which total internal reflection occurs. The material may, for example, have a critical angle of less than 45 degrees, among others. The sampler may have a one-piece construction and/or portions of the sampler may be formed integrally with one another. For example, the shaft and the tip may be formed integrally with one another, ignoring any reflective coating that may be present on the tip (e.g., on the downstream side thereof). Also or alternatively, the mounting portion and the shaft (and/or light guide) may be formed integrally with one another. Accordingly, in some embodiments, the sampler may be monolithic (ignoring any coating thereon). Alternatively, in other embodiments, the sampler may be formed of two or more pieces that are attached (e.g., bonded) to one another. Any suitable process may be utilized to create the sampler, such as injection molding, machining, and/or the like.

The mounting portion of the light sampler may have any suitable size, shape, and surface features. The width of the mounting portion may be greater than the width of the light guide, measured orthogonal to long axis 81. A perimeter of the mounting portion extending around long axis 81 may be at least generally circular, elliptical, polygonal, or the like. A characteristic average dimension of the mounting portion, measured parallel to long axis 81, may be substantially less than the length of the light guide and/or shaft, such as less than about one-half or one-fifth of the length, among others. The mounting portion may define one or more recesses and/or one or more protrusions at which the mounting portion may be engaged with attachment structure of the detection system.

Further aspects of detection system 50 and light sampler 60 that may be suitable are described in the following section.

II. EXAMPLES

The following examples describe selected aspects and embodiments of the present disclosure related to detection systems with light sampling. These examples are included for illustration and are not intended to limit or define the entire scope of the present disclosure.

Example 1

Light Sampler Embodiment

This example describes an exemplary embodiment 120 of the light sampler of FIG. 1; see FIGS. 9-14. Any combination of features of light sampler 120 may be incorporated into any of the light samplers disclosed above in Section I.

Light sampler 120 has a base 88 equipped with features to facilitate mounting and alignment. The base has a plurality of protrusions 122 located at a perimeter of the base. The protrusions provide an interference fit when the base is pressed into a mounting bracket. The base also has a pin 124 projecting from the bottom side of base 88. The pin defines the rotational orientation of the sampler about long axis 81 in which the base can be pressed into the mounting bracket, and ensures the rotational orientation with respect to the beam is correct. A recess 126 is defined by a top side of base 88 opposite pin 124. The recess provides a position for a mold gate, when the light sampler is injection molded.

Optical window 100 of sampler 120 is positioned on long axis 81. The window is recessed (see FIGS. 9 and 14), which may protect the window from damage when the sampler is being handled or installed.

Example 2

Intensity Distributions

Figure 15:
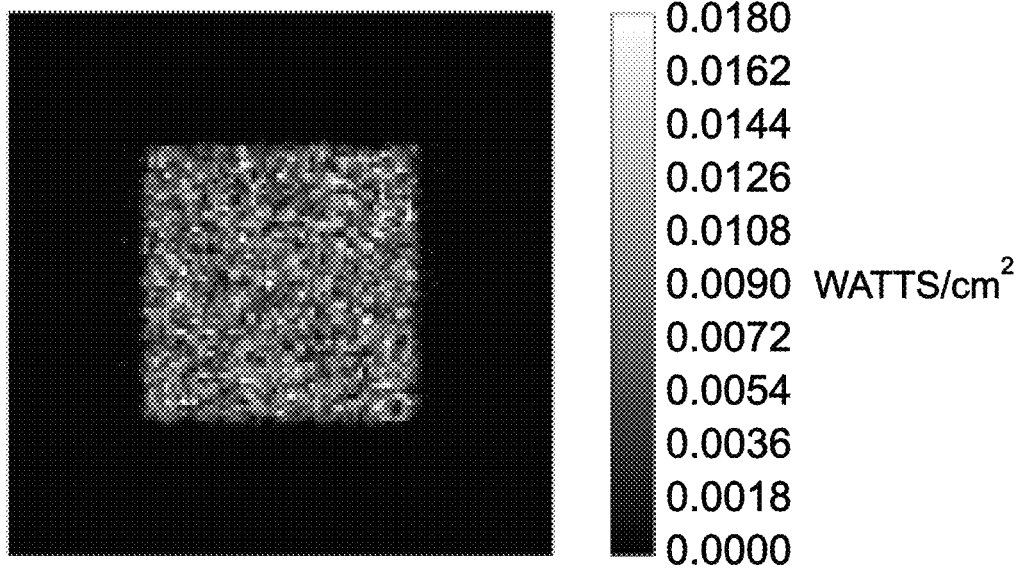
FIG. 15 is a calculated intensity distribution of light transmitted out of the beam by the light sampler and to the detector in FIG. 1, taken generally along line 15-15 in FIG. 1.
Figure 16:
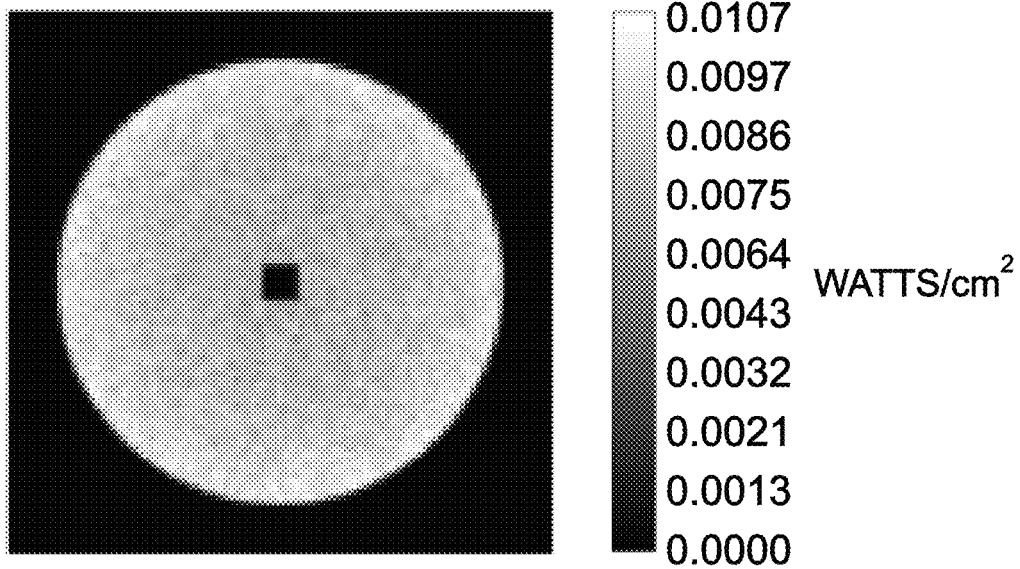
FIG. 16 is a calculated intensity distribution of the beam of FIG. 1, taken generally along line 16-16 in FIG. 1 downstream of the light sampler.

This example describes light intensity distributions calculated with optical modeling software for an exemplary embodiment of detection system 50 of FIG. 1; see FIGS. 1, 15, and 16.

FIGS. 15 and 16 show screenshots of images generated with an optical modeling program, Zemax®, version 13. The incident light beam is expected to be collimated. The light sampler will pick up and guide light reasonably well even from a converging or diverging beam. However, in such cases, the light guide may disturb the light field propagating through it all across its length. For a collimated beam incident at a normal orientation on the light guide's front (upstream) side, the disturbance is minimal.

FIG. 15 shows the intensity distribution of light exiting the light sampler through the window. The distribution covers a 2×2 mm area. The intensity distribution near the sampler matches the light guide cross-section, so a small area light sensor could be used. This is in contrast to using a controlled, low-reflectance beam splitter for sampling, where the sampled light typically occupies an area that is the same size as the incident collimated beam.

FIG. 16 shows the intensity distribution of light downstream of the light sampler. The distribution covers a 15×15 mm area. As expected, there is a square area of zero intensity representing a shadow of the light reflecting surface formed by the beveled end of the light guide. Otherwise, the light intensity distribution remains practically undisturbed. The dark spot in the light intensity profile of the beam has a negligible effect on the intensity distribution of the beam when focused elsewhere in the system (e.g., onto an examination site).

Example 3

Photoluminescence Detection System with Light Sampling

Figure 17:
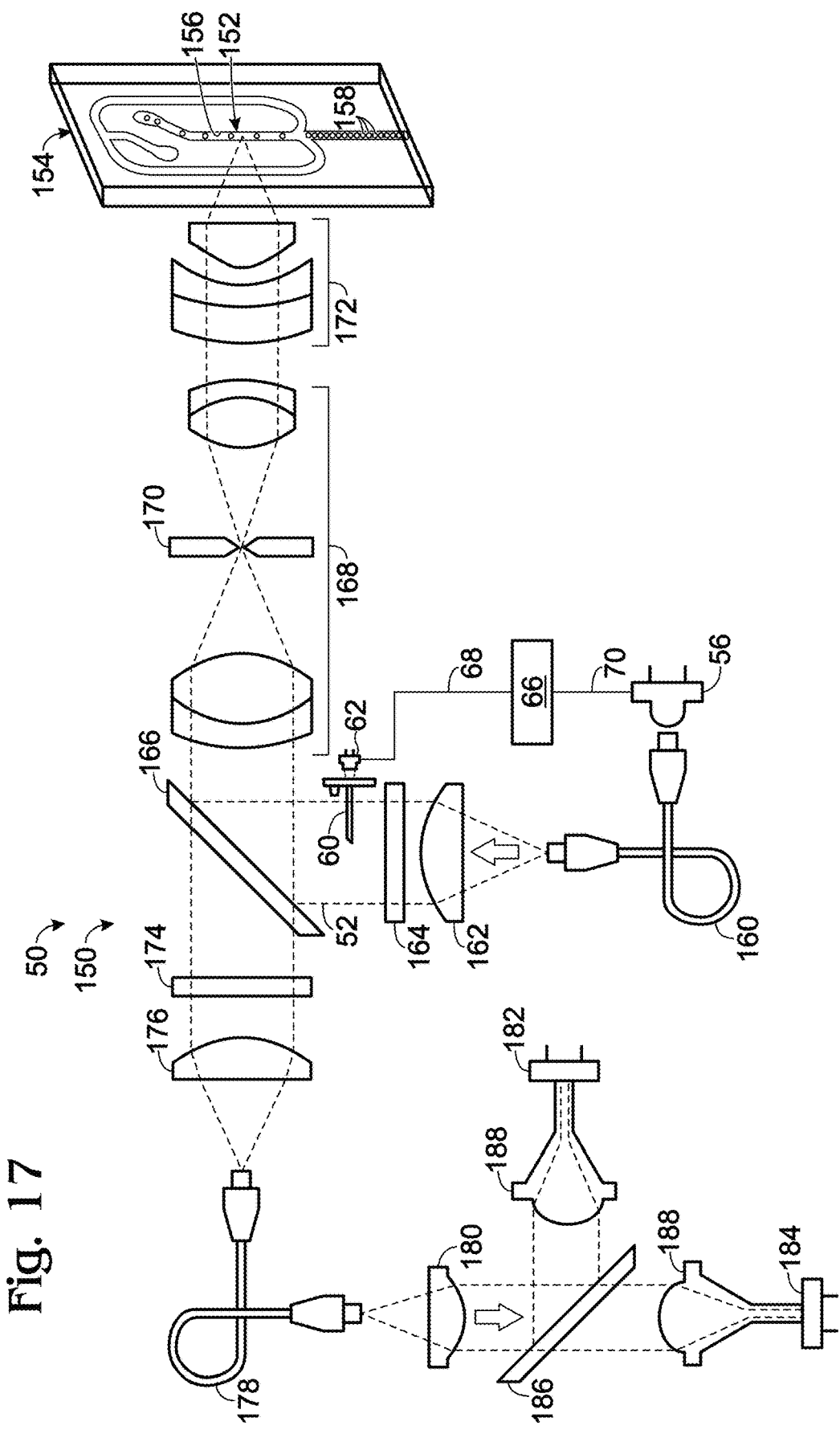
FIG. 17 is a schematic view of an exemplary photoluminescence detection system incorporating a light sampler to divert light out of a beam and to a detector, for monitoring and/or controlling the intensity of excitation light incident on an examination site.

This example describes an exemplary embodiment of detection system 50, namely, photoluminescence detection system 150 having feedback control of excitation light intensity enabled by a light sampler 60 and an associated sampling detector 62; see FIG. 17. Any combination of features disclosed in this example may be incorporated into any of the detection systems of Section I, and may be utilized with any of the light samplers of the present disclosure, such as those described in Section I and Example 1.

Detection system 150 has a feedback loop for control of light source 56. The feedback loop is created by the light source 56 (and its beam 52), light sampler 60, detector 62, and processor 66, as described above in Section I for FIG. 1. Light source 56 produces a beam of excitation light that is transmitted to an examination site 152 at which a sample is irradiated. The examination site interchangeably may be described as an irradiation zone or a detection volume.

The irradiation zone may be created at the intersection of beam 52 and a fluidic subsystem 154. The fluidic subsystem may include a channel 156 that directs fluid through examination site 152. In the depicted embodiment, the channel contains particles 158, such as droplets, disposed in a carrier fluid (e.g., oil). Excitation light from the light source induces photoluminescence (e.g., fluorescence) from at least one photoluminophore disposed in or on the particles.

The excitation light follows an optical axis from light source 56 to examination site 152. More particularly, the light is generated by light source 56 and then travels, in order, through a light guide 160, a collimating lens 162, a spectral filter 164, and through/past light sampler 60. A fraction of the excitation light is diverted from the optical path by light sampler for detection by detector 62, as described above in Section I. Nondiverted light is reflected by a beam splitter 166, passes through a spatial filter 168 including a slit-forming optical element 170, and is focused by a condenser/objective 172 onto examination site 152.

The excitation light stimulates light emission from the examination site. Emitted light is collected by condenser/objective 172, and then travels in a reverse direction relative to the excitation optical path through spatial filter 168. After exiting the spatial filter, emitted light passes through beam splitter 166, to leave the optical path for excitation. Emitted light then passes through a spectral filter 174, a focusing lens 176, and a light guide 178. After exiting the light guide, the emitted light passes through a collimating lens 180, and then is transmitted to photoluminescence detectors 182, 184 by a beam splitter 186, according to wavelength. The emitted light is focused by a focusing element 188 before reaching each detector 182, 184.

Example 4

Further Aspects of Detection Systems with Light Sampling

The present disclosure is in the field of optical detection and enables sampling a small fraction of a light beam in tight spaces and cost effectively. The sampled light fraction can be used to monitor and/or actively stabilize the intensity of a light source. A light sampler may constitute a single piece of optically transparent, injection-molded material. The sampler may include a light guide and a support base. One end of the light guide that is inserted in a sampled light beam is "cut" at an angle. The cut angle is chosen such that the light beam that is incident on the cut surface is reflected, and the reflected light propagates along the light guide, optionally by total internal reflection. The other end of the sampler that is outside of the sampled beam is terminated with a window that is perpendicular to the direction of light propagation in the light guide. A light sensor may be located in front of the window to measure the intensity of the sampled light. All surfaces of the light sampler, including the window, may be of optical quality (low roughness) to minimize losses of the sampled light. The light guide cross-section may be rectangular, and the long axis of the light guide may be positioned perpendicular to the incident light beam to minimize scattering, refraction, and reflection of the incident light. An anti-reflection coating may be applied to surface regions of the light guide to reduce reflection further. The optical design of the system may be affected by the light sampler as little as possible, i.e., the system performs similarly with or without the light sampler present.

In a tested configuration, the light sampler has a light guide that is square in cross-section. The light guide is made of an optical grade polymer having high transparency in the visible light range. The distal end of the light guide is cut at an angle of 45 degrees. The critical angle for the optical grade polymer, which has an index of refraction of approximately 1.52 in the visible range, is 41 degrees. Thus, light that is incident on the distal end at 45 degrees experiences total internal reflection and propagates along the light guide towards the window at the sampler's opposite end.

A light source could, for example, be an LED or a laser diode; in our tests green (510 nm) and red (625 nm) high power LEDs have been used. Light can be collimated directly, or coupled to a light guiding fiber and then collimated; in our tests, large core (550 micrometer core diameter) multimode fibers have been used. Furthermore, the light guide could be terminated with a flat window, or with a spherical or aspherical surface region that would collimate or focus the light exiting from the light sampler and allow one to locate the light sensor accordingly at a greater distance. A flat window version has been manufactured and experimentally tested, and both versions have been modeled. A light sensor could, for example, be a photodiode or a photomultiplier; a silicon PIN photodiode was used for our testing. A current generated by a photodiode was amplified and used to stabilize the intensity of the LED by implementing a proportional-integral-derivative (PID) loop for the LED driver. A circular base of the light sampler may be used for its support and alignment.

Example 5

Selected Embodiments

This example describes selected embodiments of the present disclosure as a series of indexed paragraphs. These embodiments should not limit the entire scope of the present disclosure.

Paragraph 1. A system for optical detection, comprising: (A) a light source configured to generate a beam of light; (B) an optical element including a light guide having a shaft and a tip, the tip tapering from the shaft to form a beveled end of the light guide, the optical element providing a window opposite the tip, wherein the optical element extends into the beam, such that the tip and at least a portion of the shaft are located inside the beam and the window is located outside the beam, and wherein light of the beam incident on the tip is transmitted longitudinally through the light guide and out the window, while light of the beam incident on the shaft is transmitted transversely through the shaft and remains in the beam downstream of the shaft; and (C) a detector configured to detect light received from the window and create a signal representative of the light detected.

Paragraph 2. The system of paragraph 1, wherein the tip has an upstream side and a downstream side, with light in the beam traveling from the upstream side to the downstream side, and wherein the downstream side forms the beveled end of the light guide and is sloped with respect to a plane orthogonal to a long axis of the light guide.

Paragraph 3. The system of paragraph 2, wherein the downstream side of the tip is sloped 40 to 50 degrees with respect to the plane.

Paragraph 4. The system of paragraph 2 or paragraph 3, wherein the upstream side of the tip is coplanar and continuous with a wall region of the shaft.

Paragraph 5. The system of any of paragraphs 1 to 4, wherein a portion of the shaft located inside the beam has a rectangular cross-section.

Paragraph 6. The system of any of paragraphs 1 to 5, wherein the tip has a rectangular cross-section.

Paragraph 7. The system of any of paragraphs 1 to 6, wherein a portion of the shaft located inside the beam has a pair of opposite wall regions oriented parallel to the beam and another pair of opposite wall regions oriented perpendicular to the beam.

Paragraph 8. The system of any of paragraphs 1 to 7, wherein the portion of the shaft located inside the beam is linear.

Paragraph 9. The system of paragraph 8, wherein a full length of the shaft is linear.

Paragraph 10. The system of any of paragraphs 1 to 9, wherein the shaft has exactly four sides each extending from the tip to an opposite end of the shaft.

Paragraph 11. The system of paragraph 10, wherein each side of the shaft is flat.

Paragraph 12. The system of any of paragraphs 1 to 11, wherein the optical element includes a base that supports the light guide and provides the window, wherein the base is formed integrally with the light guide, wherein the base is wider than the shaft, wherein the window is a surface region of the base, and wherein, optionally, the window is a recessed surface region of the base.

Paragraph 13. The system of paragraph 12, wherein the optical element is mounted in the system via the base.

Paragraph 14. The system of any of paragraphs to 1 to 13, wherein the optical element is formed of polymer.

Paragraph 15. The system of paragraph 14, wherein the shaft defines a long axis, and wherein the long axis is orthogonal to the beam.

Paragraph 16. The system of any of paragraphs 1 to 15, wherein the optical element is monolithic.

Paragraph 17. The system of any of paragraphs 1 to 16, wherein the tip and the portion of the shaft are located in a collimated region of the beam.

Paragraph 18. The system of any of paragraphs 1 to 17, further comprising a processor configured to control an intensity of the light beam in a feedback loop.

Paragraph 19. The system of any of paragraphs 1 to 18, wherein an end of the optical element opposite the beveled end is attached to the detector.

Paragraph 20. The system of paragraph 19, wherein the end of the optical element opposite the beveled end is bonded to the detector.

Paragraph 21. An optical element for sampling light, comprising: (A) a light guide configured to transmit light longitudinally through the light guide by internal reflection, the light guide including (i) a shaft having four sides and a rectangular cross-section, and (ii) a tip tapering from the shaft to form a beveled end of the light guide and having a wall region that is coplanar and continuous with one of the four sides of the shaft; and (B) a window located opposite the tip and formed integrally with the shaft and the tip.

Paragraph 22. The optical element of paragraph 21, wherein the tip and at least part of the shaft are configured to be disposed in a beam of light, with the shaft arranged orthogonal to the beam and the window outside the beam, such that light of the beam incident on the tip enters the tip and is reflected by the beveled end of the light guide into the shaft, and is transmitted longitudinally through the shaft and out of the window, while light of the beam incident on one of the four side walls of the shaft is transmitted transversely through the shaft and remains in the beam downstream of the shaft.

Paragraph 23. The optical element of paragraph 21 or paragraph 22, wherein the shaft is linear.

Paragraph 24. The optical element of any of paragraphs 21 to 23, further comprising a base formed integrally with the light guide.

Paragraph 25. A method of monitoring the intensity of a beam of light, the method comprising: (A) generating a beam of light that is incident on an optical element including a light guide having a shaft and a tip, the tip tapering from the shaft, the optical element providing a window opposite the tip, wherein the tip and at least a portion of the shaft are disposed in the beam, with the shaft arranged crosswise to the beam and the window located outside the beam, such that light of the beam incident on the tip is transmitted longitudinally through the shaft and out of the window, while light of the beam incident on the shaft is transmitted transversely through the shaft and remains in the beam downstream of the shaft; and (B) detecting light from the window to create a signal.

Paragraph 26. The method of paragraph 25, further comprising a step of controlling an intensity of the beam based on the signal.

Paragraph 27. The method of paragraph 26, wherein the step of controlling reduces fluctuation in the intensity of the beam.

The term "about," as used herein with respect to a value, means within 10% of the stated value. For example, a dimension described as being "about 10" means that the dimension is greater than 9 and less than 11.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

I claim:

1. A system for optical detection, comprising:
a light source configured to generate a beam of light to illuminate a sample located in an examination region;
an optical element including a light guide and an exit window, wherein the optical element extends into the beam upstream of the examination region, such that at least a portion of the light guide is located inside the beam and the exit window is located outside the beam, wherein a portion of light of the beam incident on the light guide is transmitted longitudinally through the light guide and out the exit window, and wherein another portion of light of the beam incident on the light guide propagates across the light guide and remains in the beam downstream of the light guide;
a first detector configured to detect light from the exit window; and
a second detector configured to detect light from the examination region; and
wherein the optical element includes a base that supports the light guide and provides the exit window, wherein the base is wider than and formed integrally with the light guide, and wherein the exit window is a surface region of the base.

2. The system of claim 1, wherein an end of the light guide is located in the beam and has an upstream side and a downstream side, and wherein the downstream side is sloped with respect to a plane orthogonal to a long axis of the light guide.

3. The system of claim 2, wherein an upstream side of the end of the light guide is coplanar and continuous with a lateral surface of the light guide.

4. The system of claim 1, wherein the light guide has a rectangular cross-section.

5. The system of claim 1, wherein the light guide located has a pair of opposite wall regions oriented parallel to the beam and another pair of opposite wall regions oriented perpendicular to the beam.

6. The system of claim 1, wherein the light guide has a shaft, and wherein the shaft has four sides.

7. The system of claim 1, wherein the light guide defines a long axis inside the beam, and wherein the long axis is orthogonal to the beam.

8. The system of claim 1, further comprising a processor configured to control an intensity of the beam in a feedback loop including the first detector, to reduce fluctuation in the intensity of the beam.

9. The system of claim 1, wherein the optical element is elongated between a first end and a second end, wherein the first end is located in the beam and the second end is attached to the first detector.

10. A system for optical detection, comprising:
a light source configured to generate a beam of light to illuminate a sample located in an examination region;
an optical element including a light guide and an exit window, wherein the optical element extends into the beam upstream of the examination region, such that at least a portion of the light guide is located inside the beam, and wherein a portion of light of the beam incident on the light guide is transmitted longitudinally through the light guide and out the exit window;
a detector configured to detect light from the exit window; and
a processor configured to control an intensity of the light beam in a feedback loop including the detector, to reduce fluctuation in the intensity of the light beam; and
wherein the optical element includes a base that supports the light guide and provides the exit window, wherein the base is wider than and formed integrally with the light guide, and wherein the exit window is a surface region of the base.

11. The system of claim 10, wherein the detector is a first detector, further comprising a second detector configured to detect light from the examination region.

12. The system of claim 10, wherein an end of the light guide is located in the beam and has an upstream side and a downstream side, and wherein the downstream side is sloped with respect to a plane orthogonal to a long axis of the light guide.

13. The system of claim 10, wherein the light guide has a rectangular cross-section.

14. The system of claim 10, wherein the light guide has a pair of opposite wall regions oriented parallel to the beam and another pair of opposite wall regions oriented perpendicular to the beam.

15. The system of claim 10, wherein the light guide has a shaft, and wherein the shaft has four sides.

16. The system of claim 10, wherein the optical element is elongated between a first end and a second end, wherein the first end is located in the beam, and wherein the second end is attached to the first detector.

17. A method of controlling light intensity using an optical element that includes a light guide and a base that supports the light guide and provides a surface region forming an exit window, the base being wider than and formed integrally with the light guide, the method comprising:
generating a beam of light intersecting the light guide such that a portion of light of the beam is transmitted longitudinally through the light guide and out of the exit window;
detecting light from the exit window to create a signal; and
controlling an intensity of the beam based on the signal to reduce fluctuation of the intensity of the beam.

18. The method of claim 17, the method further comprising:
illuminating a sample in an examination region downstream of the optical element with light of the beam; and
detecting light from the examination region.

19. The method of claim 17, wherein another portion of light of the beam is incident on, and propagates across, the light guide and remains in the beam downstream of the light guide.

* * * * *